United States Patent

Groby et al.

[11] 3,910,800
[45] Oct. 7, 1975

[54] ELECTRICAL BATTERY

[75] Inventors: Chester Groby, Nol; Carl-Goran Crafoord; John Grieves, both of Bromma, all of Sweden

[73] Assignee: Aktiebolaget Tudor, Stockholm, Sweden

[22] Filed: June 4, 1974

[21] Appl. No.: 476,319

[52] U.S. Cl. .................... 136/170; 136/181
[51] Int. Cl. ............................. H01m 1/04
[58] Field of Search ................... 136/170, 181

[56] References Cited
UNITED STATES PATENTS

| | | | |
|---|---|---|---|
| 2,570,123 | 10/1951 | Heine | 136/181 |
| 3,093,515 | 6/1963 | Rector | 136/170 |
| 3,377,205 | 4/1968 | Butterworth | 136/170 |
| 3,653,974 | 4/1972 | Brosilow | 136/181 |
| 3,788,901 | 1/1974 | Thornblad | 136/170 |

*Primary Examiner*—Donald L. Walton
*Attorney, Agent, or Firm*—Burns, Doane, Swecker & Mathis

[57] ABSTRACT

Electric storage battery having a handle formed as a sub-assembly to allow one or two persons to carry the battery. The sub-assembly includes an intermediate member that has a surface which is secured along the mid-section of the battery cover and one or more upwardly extending arms which carry hinges to which the handles are attached. The handles are shaped to cover the terminal posts. The filler caps are attached to bars which are also hingedly mounted to the ends of the intermediate member.

11 Claims, 7 Drawing Figures

U.S. Patent  Oct. 7,1975  3,910,800
FIG.1
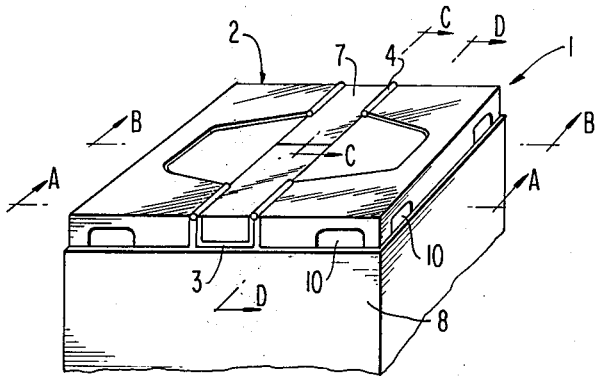
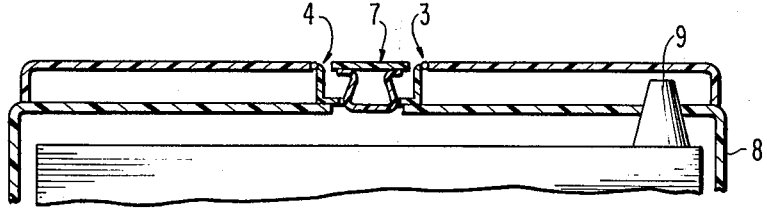
FIG.2
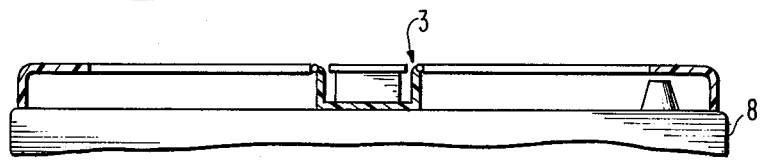
FIG.3
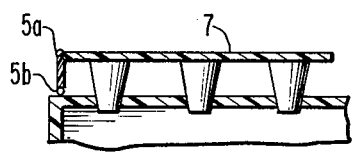
FIG.4
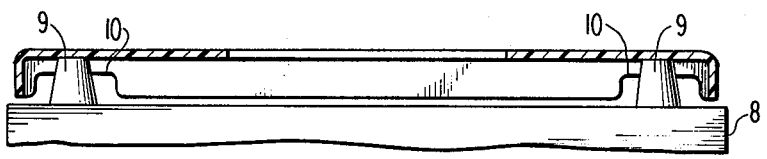
FIG.5
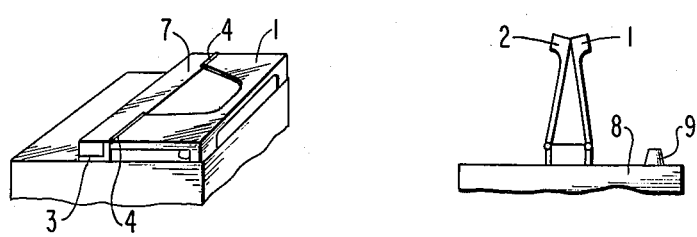
FIG.7  FIG.6

ELECTRICAL BATTERY

The present invention concerns electric storage batteries with a carrying device, and finds its primary use in conjuncation with starter batteries of the lead-acid type, and smaller standby current sources. Generally, the invention has utility with any kind of battery or storage battery that is not too heavy to be carried by two people.

Batteries generally, and storage batteries in particular, have openings at the top, for checking and adding electrolyte as needed, and for ventilation of the battery.

It has been known heretofore that batteries can be furnished with carrying devices in various ways. The handle has been made of rope, for example, or of heavy steel wire bent to handle configuration. Such handles are relatively inconvenient, however, and can be in the way when the battery is not being carried. It is also known to have the handle formed as a fixed part of the body or cover of the battery casing. Because of space requirements, the handles have been made so small as to be not convenient for carrying.

It is an object of the present invention to provide electric batteries with a novel carrying device that makes it possible conveniently to carry a battery, and at the same time, the device does not require more space than is required by the battery itself.

Another object of the invention is to provide a novel carrying device that is formed of a sub-assembly composed of an intermediate member having a flat surface that can be welded or otherwise attached to the battery casing and one or more upwardly extending legs having hinges for joining to the handles. The handles are preferably formed with a flat upper surface to minimize the space requirements and to have a size and shape that approximately conform with the cover member for the battery. A central hand engaging portion may be provided so that one or two persons can carry the battery. The entire sub-assembly may be fabricated as a unit and added to batteries as desired after fabrication of the battery is completed. A further optional feature is to provide a bar which carries the filler caps that is hingedly mounted on the intermediate member.

By means of the invention, it is possible to carry batteries more easily and conveniently than before, since the handle sub-assembly can be welded to batteries as an integral part of the battery as delivered to the user. Other advantages of the device of the invention are that several functions are brought together in one unit, e.g., a carrying handle which can be folded flat over the casing cover member and contain caps which have ventilation openings and are removable for electrolyte level inspection and for permitting the addition of electrolyte as needed.

Other objects and advantages of the invention will become more fully apparent from the claims and from the description as it proceeds in conjunction with the appended drawings wherein:

FIG. 1 is a pictorial view of the upper part of a battery equipped with a carrying device according to the invention;

FIG. 2 is a diagrammatic elevation in partial section taken along line A—A of FIG. 1;

FIG. 3 is a diagrammatic elevation in partial section taken along line B—B of FIG. 1;

FIG. 4 is a diagrammatic elevation in partial section taken along line C—C of FIG. 1;

FIG. 5 is a diagrammatic elevation in partial section taken along line D—D of FIG. 1;

FIG. 6 shows the device of FIG. 1 with the handle in the carrying position; and

FIG. 7 shows the invention in modified form having only one handle.

The carrying device of FIG. 1 is furnished with two handles 1 and 2. As also shown in FIG. 2, the handles 1 and 2 are joined near the center of the battery to an intermediate member 3. Intermediate member 3 has a U shape and the lower central portion is secured to the battery casing 8, and preferably along the entire surface of the cover member for the battery.

At the upper ends of the legs of the U-shaped member 3 are hinges 4. The hinges are connected to the ends of handles 1 and 2 so that the handles may either lie flat to be parallel with the battery cover member, as shown in FIG. 1, or raised to the carrying position, as illustrated in FIG. 6.

The U-shaped member 3 is made in such a way that it allows convenient and reliable attachment to the battery. The member 3 is preferably made of the same material used for the battery casing or cover member. Polypropylene has been found to have especially good properties as far as joining is concerned. Polypropylene also has generally been utilized for battery bodies. The U-shaped member 3 can be simply fixed on the body, as by welding. The choice of material is not a precondition of the invention; rather the carrying device may be made of any suitable material and be used on battery bodies made of any conventional material including hard rubber.

By properly shaping the handles 1 and 2, several functions can be combined with this carrying handle. Each cell in a battery of the type in question is practically without exception provided with an opening in the cover, for carrying off of gases produced in the battery, and for the addition of water or other electrolyte. These openings are provided with removable caps, either an individual cap for each cell opening, or a plurality of caps mounted together on a bar or other similar arrangement. It is appropriate to combine a carrying device of the invention with such a bar.

In FIGS. 1-4 it is shown how the bars 7 are joined with the intermediate member by hinges 5 similar to those that hold the carrying handle. As shown in FIG. 4, one bar 7 carries three filler caps. A similar bar, not shown, may be provided with a separate hinge at the other end of the battery, or a single bar 7 may extend across the entire length of the battery and carry all of the filler caps.

By providing the bar 7 with two hinges 5a and 5b, as illustrated in FIG. 4, centering of the individual caps in the respective holes is facilitated and a greater freedom in the matter of the cover configuration is provided.

In the embodiment shown in FIGS. 1-4, the carrying device has been combined with two bars 7, each fastened on the outer edge of the intermediate member 3. Other arrangements are equally effective, such for example as the case where the bars 7 can be fixed at the midpoint of U-shaped member 3, or all the individual caps can be joined by one bar. The pivot axes of the hinges 5a and 5b are generally perpendicular to the axes of the hinges 4 which carry handles 1 and 2.

Still another function that can be associated with the handles 1 and 2 is protection of the terminal posts 9. This is clearly shown in FIGS. 2 and 4, which illustrate how the posts 9 can be protected by a properly shaped carrying handle that has a layer of insulating material which extends over the top of the post. Suitably shaped cut-outs 10 may be provided to allow for the electric cables to be joined to terminals 9. This construction avoids accidental short circuit conditions from wrenches, tools or anything of the sort. The posts 9 are also protected from dirt deposits.

As shown in FIGS. 1–5, the handles 1 and 2 when formed of a plastic material such as polypropylene are provided with a planar upper surface and downwardly depending side edges having the cutouts 10 near the corners to accommodate external wiring connections to the battery which provides protection for the terminal posts 9 against possible short circuiting and dirt. The central portion is cut out as illustrated to provide central hand engaging portions so arranged, when lifted to the position shown in FIG. 6, that either one or two persons can lift the battery. The hinges 4 at opposite ends of the battery are located on opposite sides of the centrally located fill caps to provide the lifting effect near the center of the battery.

The length of the downwardly depending side edges is substantially equal to the height of the legs that support hinges 4 and these dimensions are preferably somewhat greater than the distance that terminal posts 9 protrude above the battery cover member, as shown in FIG. 2. Alternatively, the depending edges can be somewhat shorter so the handles 1 and 2 rest on top of the terminal posts 9, as shown in FIG. 5. Either construction allows ample space for a person's fingers to reach under the handles 1 and 2 to raise the handles, and at the same time provides a relatively planar upper handle surface that is substantially parallel to the battery cover member.

In the embodiment shown in FIG. 7, the battery has only one handle 1. Here, also, the handle 1 is combined with a bar 7 carrying caps for the cell openings, and is made as a terminal post shield. The hinges 4 of the handle should be so placed that the battery will hang plumb when it is carried. This has the effect that the cell openings should be shifted somewhat from the middle of the cell so that the axes of hinges 4 between the handle 1 and the intermediate member 3, which may be L-shaped or T-shaped, will be in a vertical plane through the center of gravity of the battery.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. An electric storage battery having a casing including a cover member of an electrolyte-resistant insulating material, a plurality of cells each having positive and negative terminals and a liquid electrolyte with openings in the cover member for the inspection of the electrolyte level, and means for carrying said battery comprising an intermediate member fixed to the battery casing and having a raised portion extending along the longer dimension of the battery casing, a handle having a hand engaging central portion, and hinge means attaching the ends of said handle on opposite sides of said hand engaging central portion to the raised portion of said intermediate member, said handle being movable about the axis of said hinge means between a first position substantially parallel to the upper surface of the battery cover member and a second upright position allowing manual carrying of said battery.

2. The battery as defined in claim 1 wherein said intermediate member has a lower surface secured to the battery casing and an upwardly extending leg, and said hinge means is located on said upwardly extending leg.

3. The battery as defined in claim 2 further including a bar carrying a plurality of caps for the electrolyte openings, and hinge means for mounting said bar to said intermediate member, the turning axis of said bar being substantially perpendicular to the turning axis of said handle.

4. The battery as defined in claim 2 wherein said hinge means is in a vertical plane passing through the center of gravity for said battery.

5. The battery as defined in claim 2 having a pair of handles, and wherein said intermediate member is U-shaped and has a pair of hinge means similarly located on the two legs at opposite sides of said electrolyte openings in the cover member.

6. The battery as defined in claim 5 wherein said handle comprises a flat sheet of insulating material having a substantially planar upper surface and downwardly extending flanges along marginal edges, said flat sheet extending over and covering a battery terminal post.

7. The battery as defined in claim 1 wherein said handle comprises a flat sheet of insulating material having a substantially planar upper surface and downwardly extending flanges along marginal edges, said flat sheet extending over and covering a battery terminal post.

8. The battery as defined in claim 7 further including a bar carrying a plurality of caps for the electrolyte openings, and hinge means for mounting said bar to said intermediate member, the turning axis of said bar being substantially perpendicular to the turning axis of said handle.

9. The battery as defined in claim 1 further including a bar carrying a plurality of caps for the electrolyte openings, and hinge means for mounting said bar to said intermediate member, the turning axis of said bar being substantially perpendicular to the turning axis of said handle.

10. The battery as defined in claim 1 further including a bar carrying a plurality of caps for the electrolyte openings, means including a pair of hinges having parallel pivot axes on opposite ends of a rigid member with one of said pair of hinges connected to said intermediate member and the other of said pair of hinges connected to said bar, the turning axis for each of said pair of axes being substantially perpendicular to the turning axis of said handle.

11. The battery as defined in claim 10 having a pair of handles, wherein said intermediate member is U-shaped and has a pair of hinge means having parallel turning axes located on opposite sides of said electrolyte openings in the cover member, and wherein each handle comprises a flat sheet of material having a substantially planar upper surface and downwardly extending flanges along marginal edges, said flat sheet extending over and covering the battery terminal posts.

* * * * *